Patented June 19, 1934

1,963,935

UNITED STATES PATENT OFFICE 1,963,935

VINYLETHINYL DERIVATIVES AND PROCESSES FOR PREPARING SAME

Wallace H. Carothers, Fairville, Pa., and Gerard J. Berchet, Wilmington, Del., assignors to E. I. du Pont de Nemours & Company, Wilmington, Del., a corporation of Delaware No Drawing. Application November 11, 1931, Serial No. 574,456

32 Claims. (Cl. 260—112)

This invention relates to certain new and useful organo-metallic compounds and materials derived therefrom, and to the method of preparing the same. The invention pertains particularly to vinylethinyl magnesium compounds and to new and useful products obtained therefrom.

Monovinylacetylene,

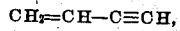

was first prepared by Willstätter and Wirth (Ber. 46, 535) who, however, obtained it only in very small amounts and reported no study of its chemical behavior. More recently, an improved process of preparation has been discovered by J. A. Nieuwland, U. S. application Serial No. 305,866, filed September 13, 1928, U. S. Patent No. 1,811,959.

Monovinylacetylene is a highly unsaturated compound and it shows an extraordinary tendency to undergo reactions of addition and polymerization. We have discovered that it is possible, nevertheless, to convert monovinylacetylene into derivatives in which the acetylenic hydrogen atom has been replaced by magnesium. These are new compounds and they can be used to prepare a great number of derivatives containing the vinylethinyl group.

An object of the present invention relates to magnesium derivatives of monovinylacetylene and their mode of preparation. A further object of the invention comprehends numerous novel products which may be obtained from the magnesium derivatives of monovinylacetylene, and the processes utilized in preparing such new products.

One method of the present invention consists in treating monovinylacetylene,

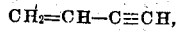

with an organo-magnesium compound derived from an alkyl or an aryl halide and metallic magnesium. Solutions containing such organo-magnesium compounds (Grignard reagents) are readily prepared by the well-known method of treating an alkyl or aryl halide with metallic magnesium in the presence of a suitable solvent such as an ether or a tertiary amine, or a hydrocarbon solvent containing an ether or a tertiary amine.

The Grignard reagents prepared by this method are usually represented by the formula RMgX in which R is a hydrocarbon radical and X is a halogen atom although it is recognized (cf. Noller, J. Am. Chem. Soc., 53, 635 (1931)) that they may have the formula R₂Mg, or that they may be in equilibrium with compounds of the formula R₂Mg. It is recognized also that such reagents usually exist in solution in a state of chemical combination with the (ether) solvent, but this combined ether does not participate in the reactions of the Grignard reagents.

According to the process of the present invention we bring together with monovinylacetylene a solution such as an ethereal solution of a Grignard reagent, whereupon a vigorous reaction takes place in accordance with the following equation:

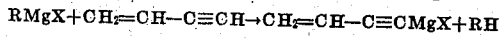

or

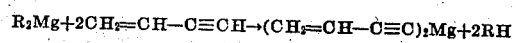

The reagent RMgX (R₂Mg) is destroyed, the alkyl or aryl radical R being converted into the corresponding hydrocarbon RH which, according to its boiling point, may be evolved as a gas or may remain in solution, and there results a solution which contains as its active ingredient a vinylethinyl magnesium derivative. This derivative may be considered as corresponding to the formula CH₂=CH—C≡C—MgY in which Y represents a halogen atom or a vinylethinyl group. This solution may be used immediately to react with a compound such as an aldehyde or a ketone into which it is desired to introduce the vinylethinyl group, or it may be stored for subsequent use. The vinylethinyl magnesium derivatives are rapidly decomposed with the regeneration of monovinylacetylene by the action of water, alcohols, acids, and other substances that contain reactive hydrogen, and they are also acted on more slowly by oxygen, air, and by carbon dioxide. Their solutions are preferably stored in completely filled, tightly closed containers in a cool, dark place. Under these conditions they can be kept for a long period of time without significant deterioration. For the purpose of using the vinylethinyl magnesium compounds as reagents to effect chemical transformations it is not necessary, and in general it is not desirable to attempt to separate or isolate them from the solutions in which they are formed.

In preparing vinylethinyl magnesium compounds according to the method of the present invention we may use as the reactant an organo-magnesium compound (Grignard reagent) prepared from any alkyl or aryl halide and metallic magnesium. Thus, we may prepare the reagent by treating metallic magnesium with methyl chloride, methyl bromide, methyl iodide, ethyl chloride, bromide, or iodide, phenyl chloride, bromide or iodide, etc. For small scale preparations methyl bromide or ethyl bromide is a preferred halide on account of the ease with which it is handled; for large scale preparations methyl chloride or ethyl chloride is preferred because of its cheapness.

In accordance with the present invention such a Grignard reagent is mixed with monovinylacetylene so as to bring about a reaction resulting in the formation of the vinylethinyl magnesium compound. This mixing may be brought about in any suitable manner, but it is necessary to take into account the fact that monovinylacetylene at ordinary temperatures and pressures is a gas (B. P. 6° C.). A preferred method of bringing about the mixing is to introduce the gaseous monovinylacetylene in a fine stream under the surface of the Grignard reagent which is contained in a cooled vessel provided with a reflux condenser. It is desirable, though not necessary, to stir the reaction mixture during this process with the aid of a mechanical stirrer. After the calculated amount of monovinylacetylene has been introduced (one mol for one mol of Grignard reagent) the mixture can be heated for a short time so that it refluxes gently to insure completion of the reaction. Another method is to add the monovinylacetylene slowly in liquid form from a refrigerated container. The monovinylacetylene can also be dissolved in a solvent such as ether or benzene. It is also possible to add a solution of the Grignard reagent to the liquid or dissolved monovinylacetylene, but in general it is easier to avoid losses if the monovinylacetylene is added to the Grignard reagent. It is preferable in any event to use a slight excess of the monovinylacetylene to insure complete utilization of the initial Grignard reagent.

By way of illustration we present the following examples:

EXAMPLE I

Seventy-two grams of magnesium in the form of shavings are placed in a flask provided with a reflux condenser, a mechanical stirrer and (near the bottom) an inlet tube for gas. The magnesium is covered with 1200 cc. of dry diethyl ether. The stirrer is started and a few drops of methyl iodide are added to the mixture. As soon as the magnesium has been slightly etched by the action of the methyl iodide, a slow stream of methyl chloride is introduced thru the gas inlet tube. The magnesium gradually dissolves to form a solution of methyl magnesium chloride. When all the magnesium has gone into solution, the gas inlet tube is disconnected from the methyl chloride tank and connected to a vessel containing monovinylacetylene. The reaction flask is cooled with an ice bath and a stream of monovinylacetylene is passed in through the gas inlet tube at such a rate that the ether refluxes only very slowly. After 172 g. of monovinylacetylene have been introduced, the reaction is practically complete. To insure complete reaction the solution is gently heated to reflux for a short time. The solution now contains the equivalent of about 2.7 mols of vinylethinyl magnesium chloride.

EXAMPLE II

One liter of a 3 molar solution of ethyl magnesium bromide in dry ether is prepared from ethyl bromide and magnesium by the usual method. This solution is placed in a flask provided with a reflux condenser cooled with brine (about —10° C.), a mechanical stirrer, and a refrigerated dropping funnel. In the dropping funnel are placed 3.5 mols of monovinylacetylene. The flask is cooled with a bath of ice and salt and the liquid monovinylacetylene is allowed to run slowly into the stirred solution. The reaction proceeds smoothly with the evolution of ethane, most of which escapes through the top of the reflux condenser. After the addition of all the monovinylacetylene the mixture is gently heated for 30-45 minutes. The reaction is then complete and the solution contains nearly the theoretical amount of vinylethinyl magnesium bromide or its equivalent. This solution may be used directly as a reagent for the preparation of other compounds containing the vinylethinyl group, as is illustrated in a subsequent portion of the specification.

The vinylethinyl magnesium compounds prepared by the method described in this invention are new compounds. They react very smoothly with an extraordinary variety of substances to produce derivatives containing the vinylethinyl group, and they thus make readily accessible a great many types of compounds that have in the past been difficult or impossible to prepare.

For the purpose of discussing the behavior of the vinylethinyl magnesium compounds we may represent them by the general formula $$CH_2=CH-C\equiv CMgX$$

in which X stands for a halogen atom the nature of which (whether chlorine, bromine or iodine) depends upon the nature of the halide used in preparing the Grignard reagent from which they are derived. We recognize that these compounds may also exist partly if not altogether in the form represented by the formula $$(CH_2=CH-C\equiv C)_2Mg,$$

and that in either form they may be combined chemically to a greater or less extent with the ether or other solvent in which they are dissolved. The validity of the following description of our invention however is not dependent upon the question of the exact structure of these compounds which we shall for brevity refer to as vinylethinyl magnesium halides and represented by the formula $$CH_2=CH-C\equiv CMgX.$$

According to the present invention we produce compounds containing the vinylethinyl group by acting on vinylethinyl magnesium halides with various types of reactants. As reactants we may use any compounds containng the nuclei $$A=B \text{ or } A\equiv B$$

in which A and B represent atoms of two different elements which are mutually united by more than one "covalent" bond. By a "covalent" bond we mean a pair of shared electrons. This is discussed on page 83, et seq., of Sidgwick—The Electronic Theory of Valence, Oxford University Press, Oxford, 1927. Examples of such reactants are aldehydes, RCH=O, such as formaldehyde, acetaldehyde, butyraldehyde, heptaldehyde, capraldehyde, stearaldehyde, acrolein, crotonaldehyde; ketones, R₂C=O, such as acetone, methylethyl ketone, acetophenone, benzophenone, stearone, methylene acetone, butyrone; carbon dioxide, O=C=O; esters, RC=O(OR'), such as ethyl formate, ethyl butyrate, methyl benzoate, butyl naphthoate, nitriles, RC≡N, such as acetonitrile, benzonitrile, butyrnitrile, naphthanitrile; sulfur dioxide, O=S=O, carboxylic acids, such as acetic acid, benzoic acid, stearic acid, and butyric acid; isocyanates, such as methyl isocyanate, phenyl isocyanate, naphthyl isocyanate; isothiocyanates, such as ethyl isothiocyanate, alkyl isothiocyanate, etc. The nature of the action of the vinylethinyl magnesium halide on these reactants consists in addition at the double or triple bond as illustrated by the following equations:

vided with a mechanical stirrer and a well cooled reflux condenser, and to add the reactant slowly or in small portions from a suitable container. The reactant may be added as such or, as is especially convenient in case the reactant is a solid, it may be dissolved in a solvent such as dry ether

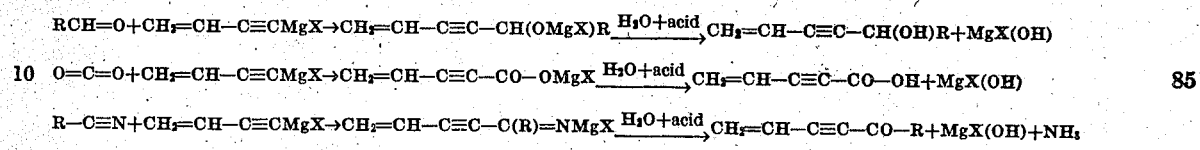

We may also use as reactants, very reactive alkyl halides such as triphenyl chloromethane, benzyl chloride, allyl bromide, etc., and esters of sulfuric and sulfonic acids such as diethyl sulfate, dimethyl sulfate, butyl p-toluene sulfonate and ethyl benzene sulfonate. The nature of the action of the vinylethinyl magnesium halide on these reactants is illustrated by the following equations:

or benzene. In certain cases it is better to add the vinylethinyl magnesium halide to the reactant. It is important to have the reactant and any liquid in which it may be dissolved free of water, alcohol, etc. and it is desirable to exclude atmospheric moisture and carbon dioxide from the reaction vessel with the aid of a soda-lime trap. The rate of adding the reactant should be regulated so that the reaction does not become

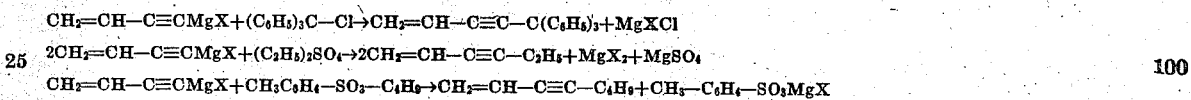

We may also use as reactants certain types of ethers exemplified by ethylene oxide and ethyl orthoformate. The nature of the action of the vinylethinyl magnesium halides on these reactants is illustrated by the following equations:

so vigorous as to cause violent refluxing. After all the reactant has been added it is usually advisable to heat the mixture so that it boils gently for a short time (15 to 60 minutes) to insure completion of the reaction. The product of the

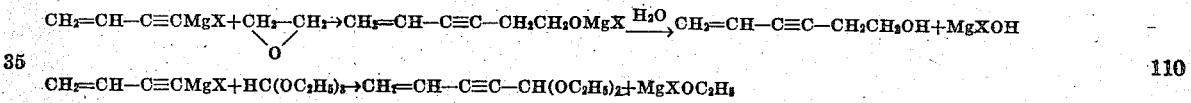

We may also use as reactants halides of other elements than carbon including halides of mercury, boron, silicon, germanium, tin, lead, phosphorus, arsenic, antimony, and bismuth. The nature of the action of the vinylethinyl magnesium halide on these halides is illustrated by the following equations:

reaction usually remains dissolved in the reaction mixture. To isolate it, the solution is treated with ice-cold dilute mineral acid or ammonium chloride solution, the aqueous layer is removed, the organic layer is washed with water and dried, and the solvent is allowed to evaporate or distill. The product thus isolated can usually be purified by distillation or crystallization.

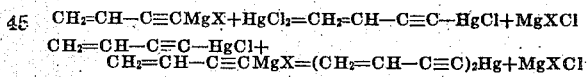

It is evident, therefore, that the process of the present invention makes it possible to prepare a great variety of new compounds. The compounds produced by the interaction of the vinylethinyl magnesium compounds and a reactive agent in the manner described above, are substituted monovinylacetylenes in which a substituent group other than hydrogen is attached to the alpha carbon atom of the acetylenic group.

Water, alcohols, ammonia, acids, and other compounds containing reactive hydrogen atoms also react with vinylethinyl magnesium halides, but the reaction results merely in the regeneration of vinylacetylene, and it is therefore not generally useful for synthetic work.

In carrying out the process of the present invention we bring together and mix any reactant of the type already indicated with a solution of a vinylethinyl magnesium halide prepared by the process described in the foregoing examples. Reaction usually occurs smoothly and rapidly at the ordinary temperature or even at temperatures as low as −10° C. In certain cases, however, it is necessary to heat the mixture to as high a temperature as 120° C. to cause the reaction to be completed. A preferred method of bringing about the mixing is to place the solution of the vinylethinyl magnesium halide in a vessel pro- The following examples illustrate the nature of our invention:

EXAMPLE III

*Preparation of a hydrocarbon containing the vinylethinyl group*

A slight excess of vinylethinyl magnesium bromide is treated with a solution of 10 grams of triphenyl chloromethane in anhydrous ether. After the completion of the reaction, the mixture is worked up by treating with water and dilute acid, separating the ethereal layer, and allowing the ether to evaporate. This yields 7.5 grams of a crystalline solid, vinylethinyl triphenyl methane. This new compound melts at 134–135° C.

$CH_2=CH-C\equiv C-MgBr+$
  $(C_6H_5)_3CCl \rightarrow CH_2=CH-C\equiv C-C(C_6H_5)_3+MgBrCl$ In a similar manner other compounds of the formula

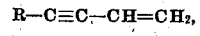

in which R represents a hydrocarbon residue, can be prepared by treating reactants consisting of alkyl halides containing very reactive halogen atoms with vinylethinyl magnesium halide. Compounds of this class can also be prepared by treating esters of sulfuric acid or aromatic sulfonic acids with vinylethinyl magnesium halides.

EXAMPLE IV

Preparation of an amide containing the vinylethinyl group

A solution of 9 grams of alpha-naphthyl isocyanate in anhydrous ether is added slowly to an excess of vinylethinyl magnesium bromide in ether. The mixture is refluxed for 30 minutes and then poured onto crushed ice. The ethereal solution is separated and allowed to evaporate. The crystalline residue is recrystallized from 50% alcohol. The product thus obtained in 93% of the calculated amount is the naphthylamide of vinylpropiolic acid melting at 125°–126° C. This is a new compound.

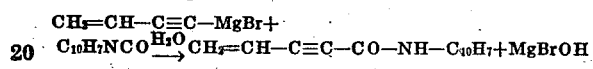

Other isocyanates may be used similarly to produce analogous compounds.

EXAMPLE V

Preparation of vinylpropiolic acid

One mol of an ethereal solution of vinylethinyl magnesium bromide is cooled to 0° C. and shaken with carbon dioxide until a color test shows the absence of any organo-magnesium halide. The solution is then treated with water and dilute acid. The ethereal layer is separated and the aqueous layer continuously extracted with ether for 10 hours. Evaporation of the combined ethereal extracts yields 60 grams of a liquid residue. When distilled at 2 mm. a considerable part of this material distills at 64–71° C. and the remainder is polymerized to a viscous rubber-like mass. The distillate is almost pure vinylpropiolic acid, a new compound. On being heated it is transformed into a tough rubber-like polymer.

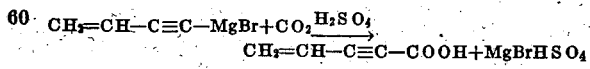

EXAMPLE VI

Preparation of a carbinol containing the vinylethinyl group

To 1.15 mols of vinylethinyl magnesium bromide in ethereal solution 40 g. of purified acetone is added slowly under a reflux condenser. After all the acetone has been added the reaction mixture is gently heated for a short time. It is then treated with water and dilute acid, the ethereal layer is separated, dried and distilled. There is thus obtained a 53% yield of pure dimethyl vinylethinyl carbinol, boiling at 59–61° C. at 17 mm. This is a new compound.

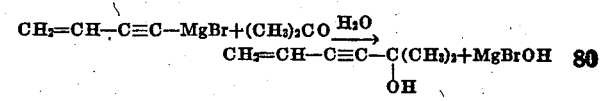

This compound is readily converted by catalytic hydrogenation into the corresponding saturated carbinol, dimethyl n-butyl carbinol. For example, 20 grams dimethyl vinylethinyl carbinol is dissolved in 75 cc. of alcohol and mixed with 0.4 grams of platinum oxide catalyst and shaken with hydrogen at 2 atmospheres for 45 minutes. It absorbs 95% of the calculated amount of hydrogen. Distillation of the liquid then gives an excellent yield of dimethyl n-butyl carbinol identical in its physical properties with that already described in the literature (Chem. Z. 1909, I, 1854).

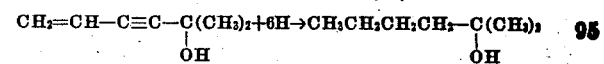

In a manner precisely similar to that illustrated in Example VI a great variety of other vinylethinyl carbinols having the general formula $$R(R')C(OH)-C\equiv C-CH=CH_2,$$

in which R and R' are hydrogen, alkyl, or aryl, can be obtained by treating aldehydes or ketones with vinylethinyl magnesium halides. The following table illustrates carbinols of this class that can be obtained in this way. All of these are new compounds.

Vinylethinyl Carbinols

| Ketone or aldehyde reactant | Formula of carbinol produced | Physical properties of carbinol | | |
|---|---|---|---|---|
| | | B. P. | Density at 20° C. | $n_D^{20°\,C.}$ |
| Acetaldehyde | $CH_3-CHOH-C\equiv C-CH=CH_2$ | 65° C. at 22 mm. | 0.911 | 1.485 |
| Butyraldehyde | $n-C_3H_7-CHOH-C\equiv C-CH=CH_2$ | 74–76° C. at 10 mm. | 0.892 | 1.478 |
| Acetone | $(CH_3)_2C(OH)-C\equiv C-CH=CH_2$ | 67° C. at 24 mm. | 0.887 | 1.478 |
| Methyl ethyl ketone | $CH_3(C_2H_5)C(OH)-C\equiv C-CH=CH_2$ | 75° C. at 20 mm. | 0.888 | 1.480 |
| Diethyl ketone | $(C_2H_5)_2C(OH)-C\equiv C-CH=CH_2$ | 62° C. at 4 mm. | 0.888 | 1.480 |
| Dipropyl ketone | $(C_3H_7)_2C(OH)-C\equiv C-CH=CH_2$ | 98–99° C. at 22 mm. | 0.874 | 1.474 |
| Methyl octyl ketone | $CH_3(C_8H_{15})C(OH)-C\equiv C-CH=CH_2$ | 98–100° C. at 5 mm. | 0.868 | 1.473? |
| Cyclopentanone | $(CH_2)_4C(OH)-C\equiv C-CH=CH_2$ | 104–105° C. at 7 mm. | 1.018 | 1.523 |
| Cyclohexanone | $(CH_2)_5C(OH)-C\equiv C-CH=CH_2$ | 84–85° C. at 2 mm. | 0.974 | 1.517 |
| Acetophenone | $CH_3(C_6H_5)C(OH)-C\equiv C-CH=CH_2$ | 125–126° C. at 4 mm. M. P. 40–41° C. | | |

The vinylethinyl carbinols are colorless liquids or crystalline solids having pleasant odors. They are useful materials for the synthesis of a variety of compounds. They can be polymerized to clear, tough, transparent resins. They are readily hydrogenated to the corresponding saturated carbinols having the general formula $$R(R')C(OH)CH_2CH_2CH_2CH_3$$

Thus the hydrogenation of dimethyl vinylethinyl carbinol as illustrated in Example VI yields dimethyl n-butyl carbinol. In a similar manner the hydrogenation of methyl ethyl vinylethinyl carbinol leads to methyl ethyl n-butyl carbinol agreeing in its properties with the compound of this structure already described in the literature. Similarly the hydrogenation of methyl n-octyl vinylethinyl carbinol yields methyl n-octyl n-butyl carbinol, a compound boiling at about 94° C. at 3 mm. and having a density of 20° C. of 0.832; and the hydrogenation of methyl phenyl vinylethinyl carbinol yields the compound methyl phenyl n-butyl carbinol, a liquid boiling at 107–109° C. at 6 mm. and having a density at 20° C. of 0.962.

It will be understood that the invention as described above is susceptible of various modifications. Any variations from the illustrations and description embodied herein, which conform to the spirit of the invention, are intended to be embraced within the scope of the claims.

We claim:

1. A chemical compound having the formula

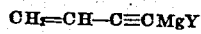

in which Y represents a halogen atom or a vinylethinyl group.

2. A process of preparing a new composition of matter which comprises reacting monovinyl acetylene with a Grignard reagent.

3. The process of preparing chemical compositions which comprises treating a compound corresponding to the formula:

in which Y represents a halogen atom or a vinylethinyl group with a Grignard reactive compound containing atoms of two different elements joined by more than one bond.

4. A product produced by the process of claim 3.

5. The process of preparing chemical compositions which comprises reacting a compound corresponding to the formula:

in which Y represents a halogen atom or a vinylethinyl group with a compound containing atoms of two different elements joined by more than one bond, said compound being of the group consisting of aldehydes, ketones, nitriles, carboxylic acid esters, carbon dioxide, isocyanates, isothiocyanates and sulfur dioxide.

6. A product produced by the process of claim 5.

7. The process of preparing chemical compositions which comprises reacting a compound corresponding to the formula

in which Y represents a halogen atom or a vinylethinyl group with an organic compound containing a carbonyl group.

8. The process of preparing chemical compositions which comprises reacting a compound corresponding to the formula

in which Y represents a halogen atom or a vinylethinyl group with an organic compound containing a carbonyl group then hydrolyzing the resulting product.

9. The process of preparing chemical compositions which comprises reacting a compound corresponding to the formula

in which Y represents a halogen atom or a vinylethinyl group with an aldehyde.

10. The process of preparing chemical compositions which comprises reacting a compound corresponding to the formula

in which Y represents a halogen atom or a vinylethinyl group with an aldehyde then hydrolyzing the resulting product.

11. The process of preparing chemical compositions which comprises reacting a compound corresponding to the formula

in which Y represents a halogen atom or a vinylethinyl group with a ketone.

12. The process of preparing chemical compositions which comprises reacting a compound corresponding to the formula

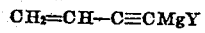

in which Y represents a halogen atom or a vinylethinyl group with a ketone then hydrolyzing the resulting product.

13. The process of preparing chemical compositions which comprises reacting a compound corresponding to the formula

in which Y represents a halogen atom or a vinylethinyl group with acetone, then hydrolyzing the resulting product.

14. The process of preparing chemical compositions which comprises reacting a compound corresponding to the formula

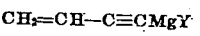

in which Y represents a halogen atom or a vinylethinyl group with an organic compound containing a carbonyl group, then hydrolyzing the resulting product and subsequently reacting with hydrogen.

15. The process of preparing chemical compositions which comprises reacting a compound corresponding to the formula

in which Y represents a halogen atom or a vinylethinyl group with an aldehyde, then hydrolyzing the resulting product and subsequently reacting with hydrogen.

16. The process of preparing compositions which comprises reacting a compound corresponding to the formula:

in which Y represents a halogen atom or a vinylethinyl group with a ketone, then hydrolyzing the resulting product and subsequently reacting with hydrogen.

17. The process of preparing chemical compositions which comprises reacting a compound corresponding to the formula

in which Y represents a halogen atom or a vinylethinyl group with an aldehyde, then hydrolyzing the resulting product and subsequently reacting with hydrogen in an amount sufficient to produce a saturated product.

18. The process of preparing chemical compositions which comprises reacting a compound corresponding to the formula:

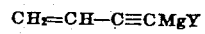

in which Y represents a halogen atom or a vinylethinyl group with a ketone, then hydrolyzing the resulting product and subsequently reacting with hydrogen in an amount sufficient to produce a saturated product.

19. As new chemical compounds, carbinols containing the vinylethinyl radical.

20. As a new chemical compound, dimethyl vinylethinyl carbinol.

21. The process which comprises reacting a vinylethinyl carbinol with hydrogen in the presence of a hydrogenating catalyst.

22. As new chemical compounds, amides of a vinylethinyl alpha carboxylic acid.

23. As new chemical compounds, vinylethinyl alpha carboxylic acids.

24. New chemical compounds having the following formula

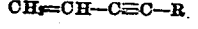

in which R is a radical other than hydrogen or an element which will form a chloride.

25. The process which comprises reacting monovinylacetylene with a Grignard reagent then treating the reaction product with a Grignard reactive compound containing atoms of two different elements joined by more than one bond.

26. The process which comprises reacting monovinylacetylene with a Grignard reagent then treating the reaction product with a compound containing atoms of two different elements joined by more than one bond, said compound being of the group consisting of aldehydes, ketones, nitriles, carboxylic acid esters, carbon dioxide, isocyanates, isothiocyanates and sulfur dioxide.

27. The process which comprises reacting monovinylacetylene with a Grignard reagent and treating the reaction product with an aldehyde.

28. The process which comprises reacting monovinylacetylene with a Grignard reagent and treating the reaction product with a ketone.

29. The process which comprises reacting monovinylacetylene with a Grignard reagent, treating the reaction product with an aldehyde, then hydrolyzing the resulting product and subsequently reacting with hydrogen.

30. The process which comprises reacting monovinylacetylene with a Grignard reagent, treating the reaction product with a ketone, then hydrolyzing the resulting product and subsequently reacting with hydrogen.

31. Chemical compounds having the following formula:

$$CH_2=CH-C\equiv C-R$$

in which R is a monovalent organic radical.

32. A polymer of a vinylethinyl alpha carboxylic acid.

WALLACE H. CAROTHERS.
GERARD J. BERCHET.